UNITED STATES PATENT OFFICE.

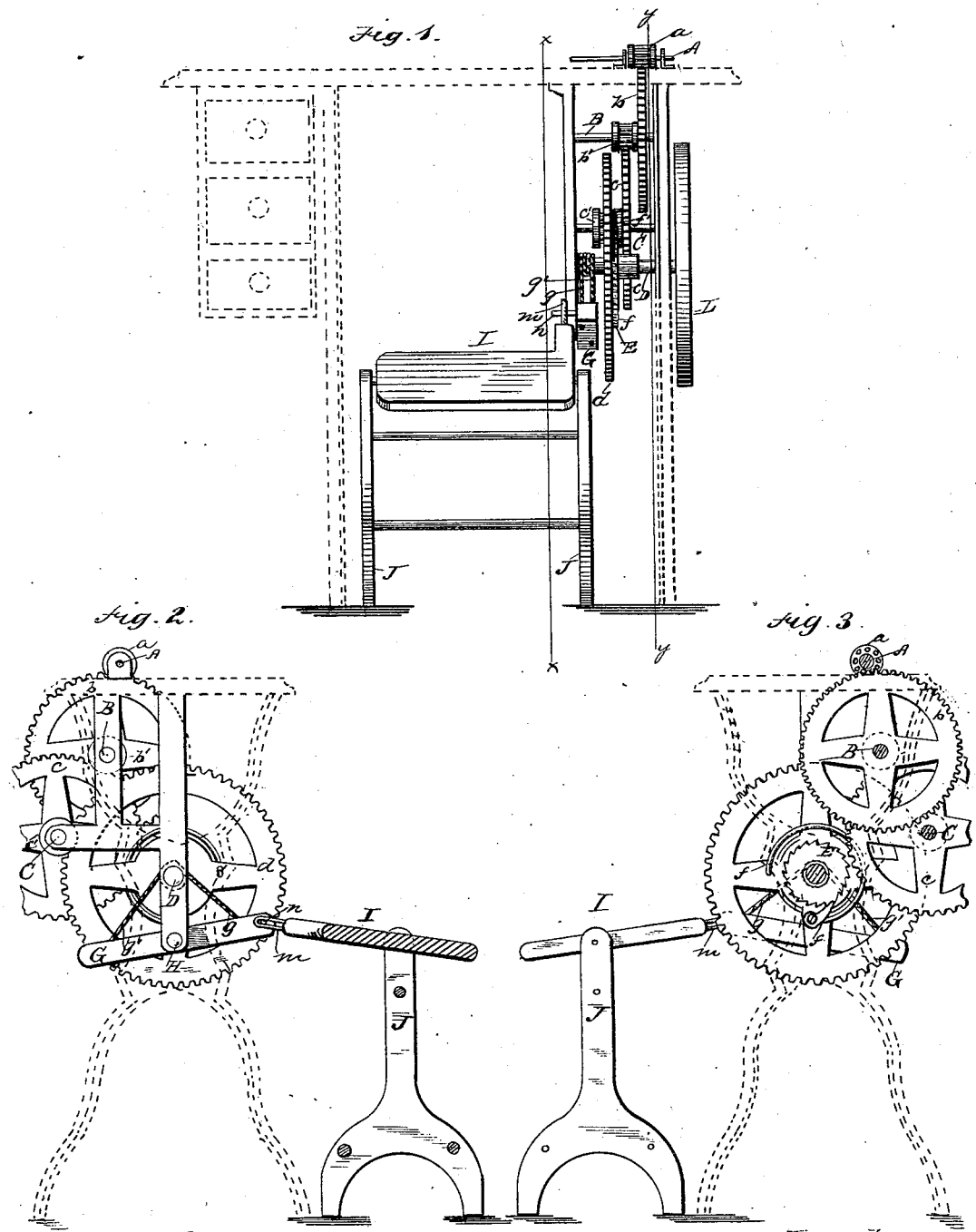

THOMAS E. MARABLE, OF PETERSBURG, VIRGINIA, ASSIGNOR OF ONE-HALF OF HIS RIGHT TO JOSEPH G. GRISWOLD, OF SAME PLACE.

MOTOR FOR SEWING-MACHINES.

SPECIFICATION forming part of Letters Patent No. 226,529, dated April 13, 1880.

Application filed March 11, 1880. (No model.)

*To all whom it may concern:*

Be it known that I, THOMAS E. MARABLE, of Petersburg, in the county of Dinwiddie and State of Virginia, have invented a certain new and Improved Motor for Sewing-Machines and other Light Machinery; and I do hereby declare the following to be a full, clear, and exact description of the same, reference being had to the accompanying drawings, forming part of this specification, in which—

Figure 1 is a front view; Fig. 2, a sectional view taken on the line $x\,x$, Fig. 1, and Fig. 3 a sectional view taken on the line $y\,y$, Fig. 1.

Similar letters of reference in the several figures denote the same parts.

The object of this invention is to produce an improved motor for driving sewing-machines and other light machinery.

The invention proceeds upon the principle of utilizing a portion of the weight of the operator, and thereby relieving him or her from the necessity of the continuous and injurious muscular exertion now necessary in running sewing-machines and other machines operated in a similar manner.

The mechanism is connected with a rocking seat so constructed and combined with the motor that the operator, by inclining his body forward or throwing his weight forward of the center upon which the seat turns, runs the machine continuously for a considerable time until the operating-lever, which connects the rocking seat to the running machinery, reaches the limit of its movement, whereupon the operator, by a slight movement of his body, rocks the seat in the opposite direction and instantly resets said connecting-lever.

The running machinery is preferably provided with a fly-wheel, to prevent any interruption of its movement during the momentary resetting of the lever.

The invention consists in the construction and combination of the motor, substantially as hereinafter described and claimed.

In the drawings, A is the working shaft of the sewing-machine or other machine which it is desired to operate by means of the motor. This shaft is provided with a lantern-wheel, $a$, which gears with a spur-wheel, $b$, upon a shaft, B. The shaft B is further provided with a lantern-wheel, $b'$, which gears with a spur-wheel, $c$, arranged upon a shaft, C. The shaft C is further provided with a lantern-wheel, $c'$, which gears with a spur-wheel, $d$, mounted loosely upon a shaft, D, or upon a disk, $d'$, which is rigidly fixed to said shaft D. At one side of the spur-wheel $d$ is a ratchet-wheel, E, fixed in any suitable manner to the shaft D, so as to revolve therewith. A spring-pawl, $f\,f'$, connects the ratchet E to the wheel $d$ in such manner as to permit the ratchet-wheel to back without moving the spur-wheel $d$ to drive the spur-wheel with it when it runs forward. At the opposite side of the spur-wheel $d$ a lever, G, is mounted upon any suitable support and fulcrum, H, and is connected to the shaft D by means of two cords, chains, or wires, $g\,g'$, as shown in the drawings, so that by oscillating said lever G the shaft D will be caused to run forward or backward, according to the direction in which the lever is oscillated. The cords are so connected to the shaft and lever that when the outer end of the lever, next to the operator's seat, is raised the shaft will be rotated backward, or in such manner that the pawl will slip upon the ratchet-wheel, which movement resets the connecting-lever for work. When the same outer end of the connecting-lever is moved downward the rotation of the shaft is in the reverse direction, and drives the ratchet-wheel forward, causing it to engage with the pawl and communicate an operative movement through the entire train of gearing to the working shaft A, as will be readily understood without further explanation.

The operator's seat is shown at I, and may be mounted upon any suitable standards or supports J in such manner as to oscillate upon a shaft or center, $i$. The front end of the seat is connected in any suitable manner to the outer end of the lever G, so that by rocking the seat backward the lever will be reset and by rocking the seat forward the lever will set the mechanism in working operation.

The connection between the seat and the lever, as shown in the drawings, consists simply in a slotted arm or staple, $m$, attached to the seat, and a pin, $n$, projecting from the side of the lever G through the slot or staple $m$.

In order that the forward movement of the working mechanism may not be interrupted during the momentary resetting of the lever G, such working mechanism may be provided at any suitable point with or connected to a fly-wheel, L. In the drawings such fly-wheel is shown mounted upon the shaft D.

The train of gearing may be increased to any desired extent.

I do not limit myself to the form of the gear-wheels shown, but may use any equivalent form of gearing, or even substitute pulleys and belts in place of those gear-wheels which come nearest to the working shaft A. Nor do I limit myself to the particular form or construction of the seat or the connecting-lever G, so long as they are constructed and arranged to produce the same result in substantially the same manner above described and illustrated.

In the operation of this machine the natural position of the operator in leaning forward, watching and directing his work, will throw his weight upon the forward end of the seat, causing it to slowly depress the outer end of the lever G, and thereby to continue the working mechanism in operation for a considerable length of time. When the lever G reaches the limit of its downward movement a slight and easy change of position on the part of the operator will instantly raise the lever and reset it for work without necessarily interrupting the continuous operation of the driven machinery. The operator is thus substantially relieved from that continuous and injurious exercise of the muscles of the legs and abdomen required in driving machinery by treadle power, which has heretofore been a prolific cause of disease among females employed in running sewing-machines.

I claim as my invention—

The combination of the oscillating seat I, the connecting-lever G, the cords $g$ $g'$, the oscillating shaft D, the loose wheel $d$, the ratchet and pawl E $f$, and the train of gearing connecting shaft and parts to the working shaft A, substantially as herein described.

THOMAS E. MARABLE.

Witnesses:
W. BLACKSTOCK,
W. H. H. KNIGHT.